(12) United States Patent
Jakkireddy et al.

(10) Patent No.: US 9,583,920 B2
(45) Date of Patent: Feb. 28, 2017

(54) INTERLOCK SYSTEM FOR A SHUTTER SEPARATING A BUS BAR PORTION FROM AN ELECTRICAL COMPONENT PORTION OF AN ELECTRICAL ENCLOSURE

(71) Applicant: General Electric Company, Schenectady, NY (US)

(72) Inventors: Ayyapa Reddy Jakkireddy, Hyderabad (IN); Sasi Kiran Tallam, Hyderabad (IN); Xuewei Sun, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/660,220

(22) Filed: Mar. 17, 2015

(65) Prior Publication Data

US 2015/0280405 A1 Oct. 1, 2015

(30) Foreign Application Priority Data

Mar. 31, 2014 (CN) .......................... 2014 1 0124787

(51) Int. Cl.
*H02B 11/133* (2006.01)
*H01H 9/22* (2006.01)
(Continued)

(52) U.S. Cl.
CPC ............. *H02B 11/133* (2013.01); *H02B 1/14* (2013.01); *H02B 1/20* (2013.01); *H02B 1/48* (2013.01);
(Continued)

(58) Field of Classification Search
CPC ... H02B 1/06; H02B 1/14; H02B 1/48; H02B 11/24; H02B 11/133; H01H 9/22–9/226
(Continued)

(56) References Cited

U.S. PATENT DOCUMENTS

| | | | |
|---|---|---|---|
| 5,691,518 A | 11/1997 | Jones et al. | |
| 8,604,368 B2* | 12/2013 | Kim | H02B 11/24 200/50.22 |

(Continued)

FOREIGN PATENT DOCUMENTS

| | | |
|---|---|---|
| CN | 101499630 A | 8/2009 |
| CN | 202217954 U | 5/2012 |

(Continued)

OTHER PUBLICATIONS

Shore Power, "Medium Voltage Metal-Clad Switchgear", pp. 1-26, 2011.
(Continued)

*Primary Examiner* — Zachary M Pape
(74) *Attorney, Agent, or Firm* — GE Global Patent Operation; Stephen G. Midgley (57) ABSTRACT

An electrical enclosure for an electrical component includes a housing having a bus bar portion and an electrical component portion arranged to receive the electrical component. At least one shutter is moveably arranged between the bus bar portion and the electrical component portion. A shutter interlock is arranged in the electrical component portion. The shutter interlock is configured and disposed to prevent the at least one shutter from shifting from a closed position to an open position when the electrical component is absent from the electrical component portion of the housing.

16 Claims, 7 Drawing Sheets

(51) Int. Cl.
  *H02B 1/14*   (2006.01)
  *H02B 1/20*   (2006.01)
  *H02B 1/48*   (2006.01)
  *H02B 11/24*  (2006.01)

(52) U.S. Cl.
  CPC .............. *H02B 11/24* (2013.01); *H01H 9/22* (2013.01); *H01H 9/226* (2013.01)

(58) Field of Classification Search
  USPC ............... 361/607, 609, 615, 617; 200/50.22
  See application file for complete search history.

(56) References Cited

U.S. PATENT DOCUMENTS

2007/0137991 A1  6/2007  Kashyap et al.
2011/0122550 A1  5/2011  Magri et al.

FOREIGN PATENT DOCUMENTS

| EP | 1962397 A1 | 8/2008 |
|----|------------|--------|
| JP | 0951606 A | 2/1997 |
| JP | 1042410 A | 2/1998 |
| JP | 2005184943 A | 7/2005 |
| JP | 2011200065 A | 10/2011 |
| JP | 2011234542 A | 11/2011 |
| KR | 20080079566 A | 9/2008 |
| WO | 2012004149 A1 | 1/2012 |
| WO | 2012146489 A1 | 11/2012 |

OTHER PUBLICATIONS

Eaton, "Metal-Clad Switchgear-VacClad-W-Medium Voltage", Sep. 2011.

\* cited by examiner

INTERLOCK SYSTEM FOR A SHUTTER SEPARATING A BUS BAR PORTION FROM AN ELECTRICAL COMPONENT PORTION OF AN ELECTRICAL ENCLOSURE

BACKGROUND OF THE INVENTION

The subject matter disclosed herein relates to the art of electrical enclosures and, more particularly, to an interlock system for a shutter that separates a bus bar portion from an electrical component portion of an electrical enclosure.

In general, a switchgear serves as an interface between an electrical supply and an electrical load. The switchgear is arranged in an enclosure that includes a line or busbar portion and a load or circuit breaker portion. The busbar portion includes one or more busbars that are connected to the electrical supply. The circuit breaker portion includes one or more circuit breakers that are electrically connected to the one or more busbars and an electrical load. The circuit breaker is configured to interrupt a flow of current from the one or more busbars to the electrical load in the event of an over-current condition, short circuit condition and/or an over/under voltage condition. Generally, the enclosure includes a shutter that separates the bus bar portion from the circuit breaker portion. When the circuit breaker is removed, the shutter closes off access to the bus bar portion from the circuit breaker portion.

BRIEF DESCRIPTION OF THE INVENTION

According to one aspect of an exemplary embodiment, an electrical enclosure for an electrical component includes a housing having a bus bar portion and an electrical component portion arranged to receive the electrical component. At least one shutter is moveably arranged between the bus bar portion and the electrical component portion. A shutter interlock is arranged in the electrical component portion. The shutter interlock is configured and disposed to prevent the at least one shutter from shifting from a closed position to an open position when the electrical component is absent from the electrical component portion of the housing.

According to another aspect of an exemplary embodiment, a switchgear for a circuit breaker includes a housing having a bus bar portion and a circuit breaker portion arranged to receive the circuit breaker. A first circuit breaker support rail is arranged in the circuit breaker portion and a second circuit breaker support rail is arranged in the circuit breaker portion spaced from the first circuit breaker support rail. The first and second circuit breaker rails are arranged to support the circuit breaker in the circuit breaker portion. At least one shutter is arranged in the housing between the bus bar portion and the circuit breaker portion. The at least one shutter is selectively moveable between an open position and a closed position. At least one shutter interlock is pivotally mounted to one of the first and second circuit breaker support rails. The at least one shutter interlock is configured and disposed to prevent the at least one shutter from shifting from the closed position to the open position when the circuit breaker is absent from the circuit breaker portion of the housing.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
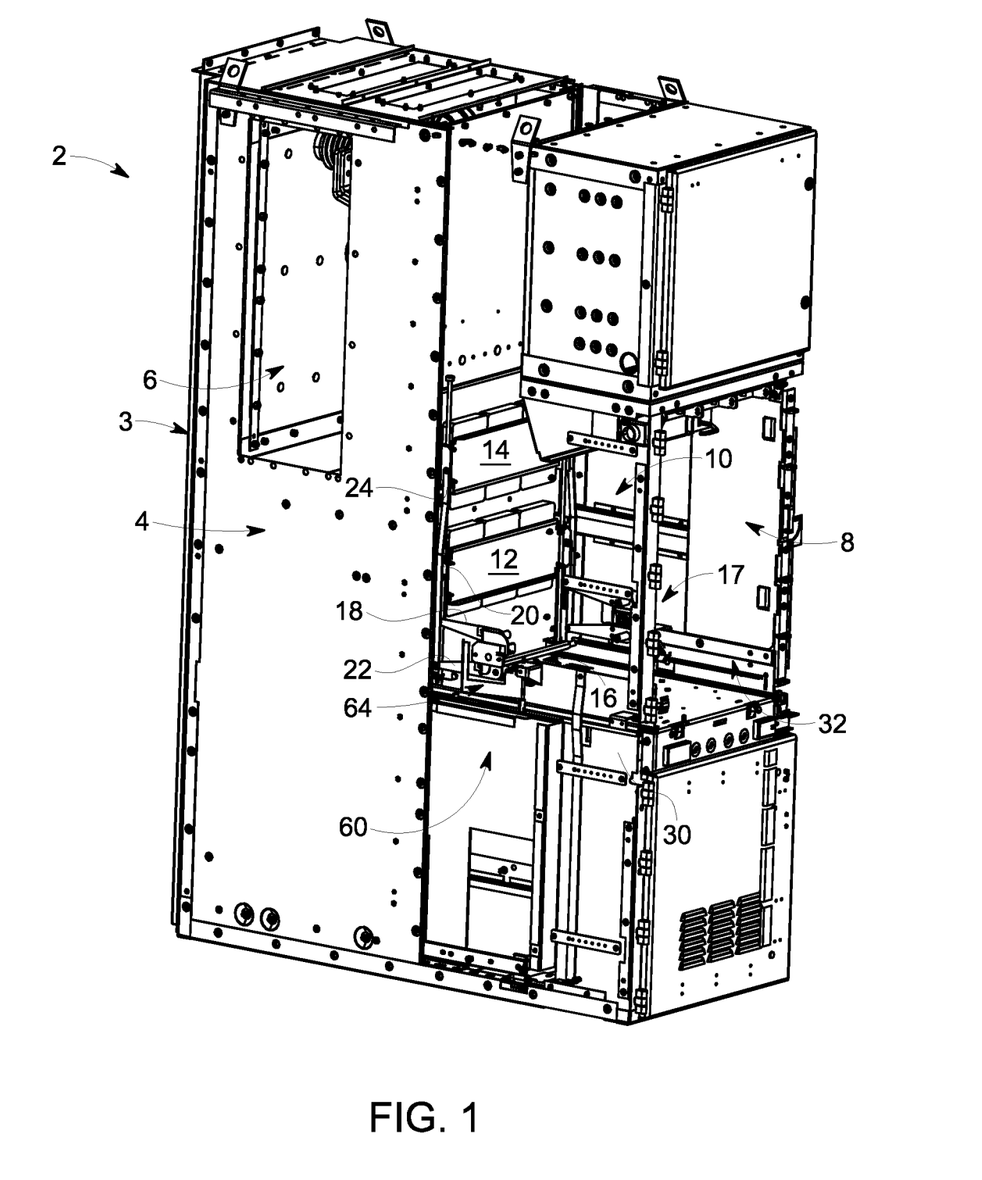
FIG. 1 is a perspective view of an electrical enclosure including a bus bar portion and an electrical component portion, in accordance with an exemplary embodiment.

An electrical enclosure, in accordance with an exemplary embodiment, is indicated generally at 2, in FIG. 1. Electrical enclosure 2 is shown in the form of a switchgear 3 having a housing 4. Housing 4 includes a bus bar portion 6 that houses one or more electrical busses (not shown) and an electrical component portion 8. Housing 4 also includes a shutter system 10 that provides a selectively moveable barrier between bus bar portion 6 and electrical component portion 8. Shutter system 10 includes a first selectively shiftable shutter 12 and a second selectively shiftable shutter 14.

Figure 2:
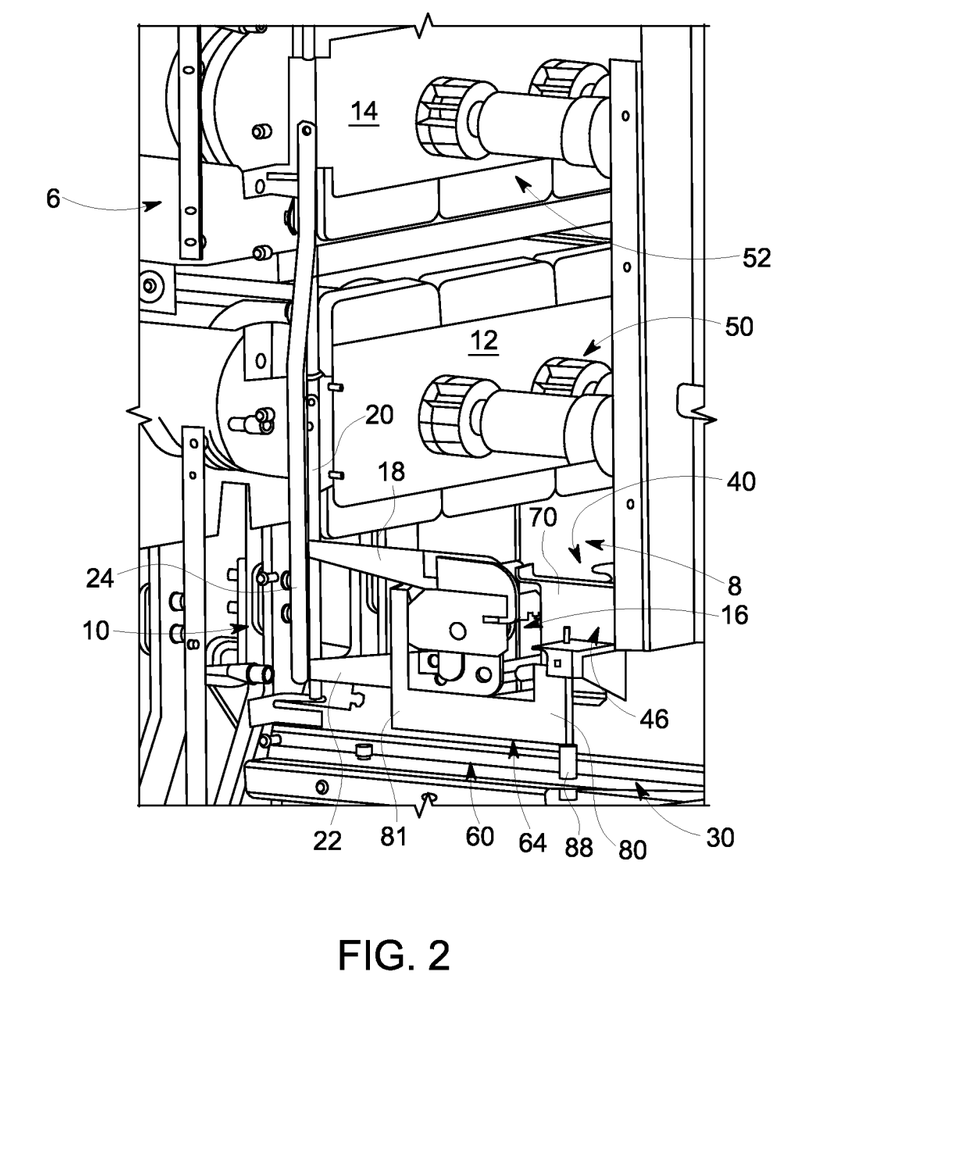
FIG. 2 is an interior view of the electrical enclosure illustrating first and second shutters separating the bus bar portion from the electrical component portion in a closed position.

Shutter system 10 includes a first operating mechanism 16 and a second operating mechanism 17 that selectively opens and closes first and second shutters 12 and 14. As each operating mechanism 16 and 17 is similarly constructed, a detailed description will follow with reference to FIG. 2 in describing first operating mechanism 16 with an understanding that second operating system 17 includes corresponding structure. First operating mechanism 16 includes a first operating lever 18 connected to first shutter 12 through a first linking bar 20. Similarly, a second operating lever 22 is operatively connected to second shutter 14 through a second linking bar 24. As will be discussed more fully below, first operating lever 18 pivots downwardly opening first shutter 12 and second operating lever 22 shifts upwardly opening second shutter 14.

Figure 3:
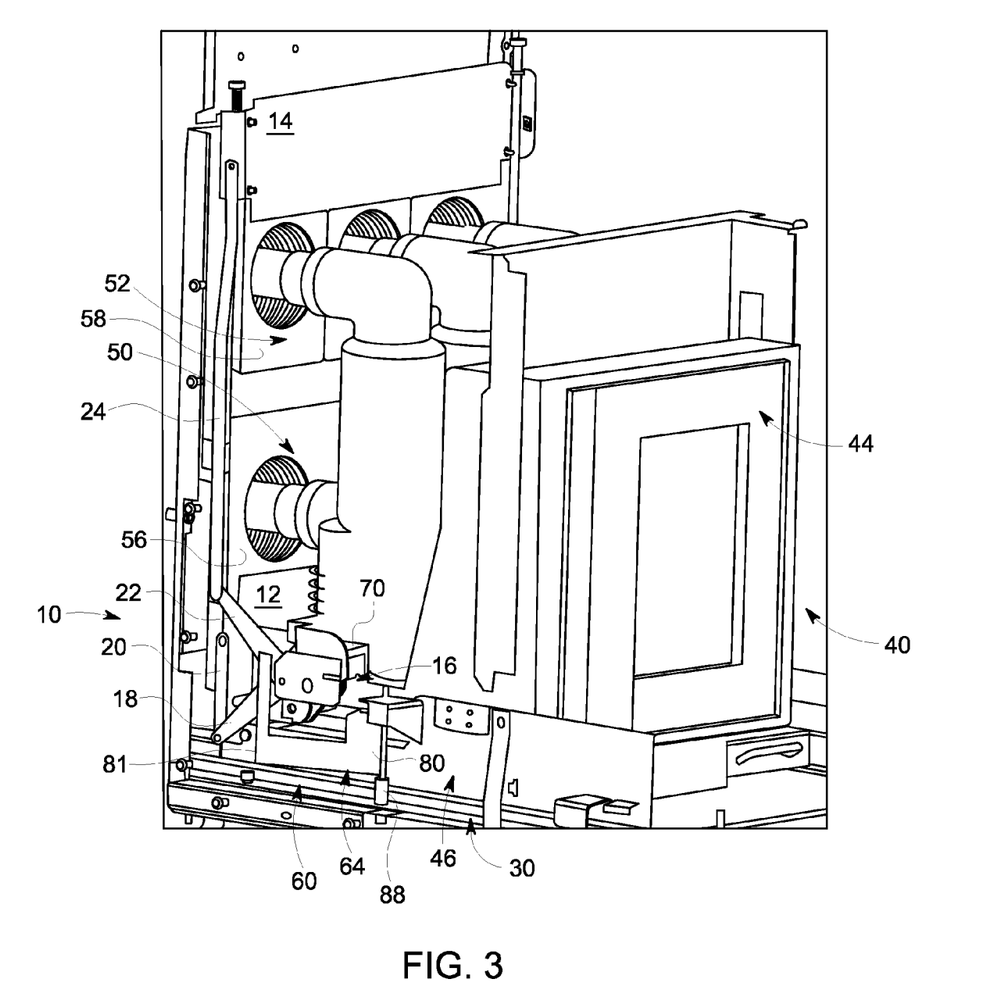
FIG. 3 is an interior view of the electrical enclosure of FIG. 2 illustrating the first and second shutters shifting to an open position upon insertion of an electrical component in the electrical component portion upon first and second component support rails.

Housing 4 is also shown to include a first component or circuit breaker support rail 30 and a second component or circuit breaker support rail 32 (FIG. 1). First and second component support rails 30 and 32 extend through electrical component portion 8 toward bus bar portion 6. In the exemplary embodiment shown, an electrical component 40 (FIG. 3), shown in the form of a circuit breaker 44, is positioned upon first and second component support rails 30 and 32. Electrical component 40 includes a support bracket 46 that slidingly engages with first and second component support rails 30 and 32. In this manner, circuit breaker 44 may be shifted toward bus bar portion 6 allowing a first plurality of terminals 50 and a second plurality of terminals 52 to slide through corresponding openings 56 and 58 (FIG. 3) that are exposed as shutters 12 and 14 open. Terminals 50 and 52 mate with bus bars (not shown) in bus bar portion 6. More specifically, as circuit breaker 44 slides along component support rails 30 and 32, support bracket 46 engages with first and second operating mechanisms 16 and 17 to open first and second shutters 12 and 14.

In accordance with an exemplary embodiment, electrical enclosure 2 includes a shutter interlock system 60 that restricts opening of first and second shutters 12 and 14 when electrical component 40 is absent from electrical component portion 8. Interlock system 60 includes a first shutter interlock 64 mounted to first component support rail 30. A second shutter interlock (not separately labeled) may be mounted to second component support rail 32. As will be discussed more fully below, shutter interlock 64 pivots between a deployed position preventing shutters 12 and 14 from opening to a non-deployed position allowing shutters 12 and 14 to open when acted upon by an interlock engagement member 70 provided on electrical component 40. Interlock engagement member 70 may take the form of a leading edge (not separately labeled) and an outwardly facing surface (also not separately labeled)

Figure 4:
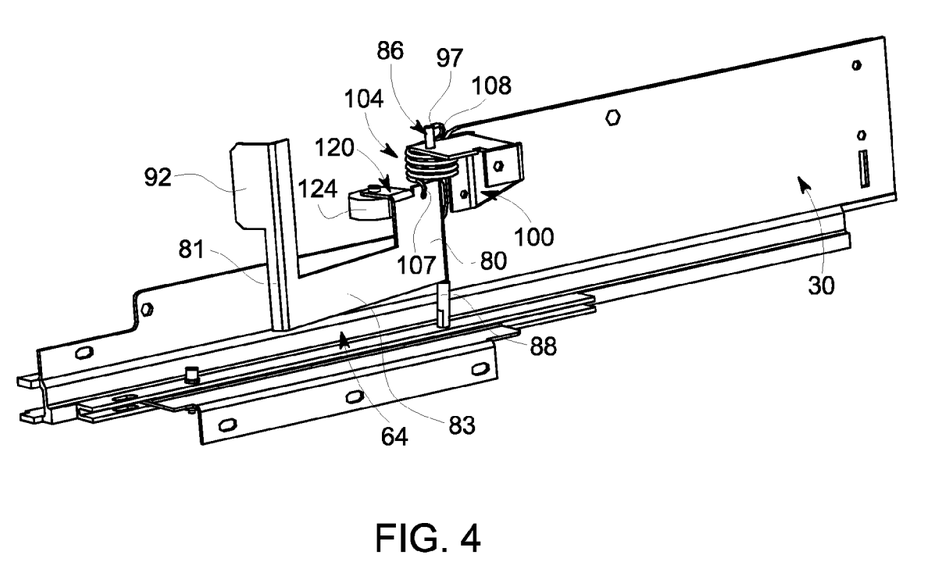
FIG. 4 is a perspective view of one of the component support rails of FIG. 3 including a shutter interlock, in accordance with an exemplary embodiment.
Figure 5:
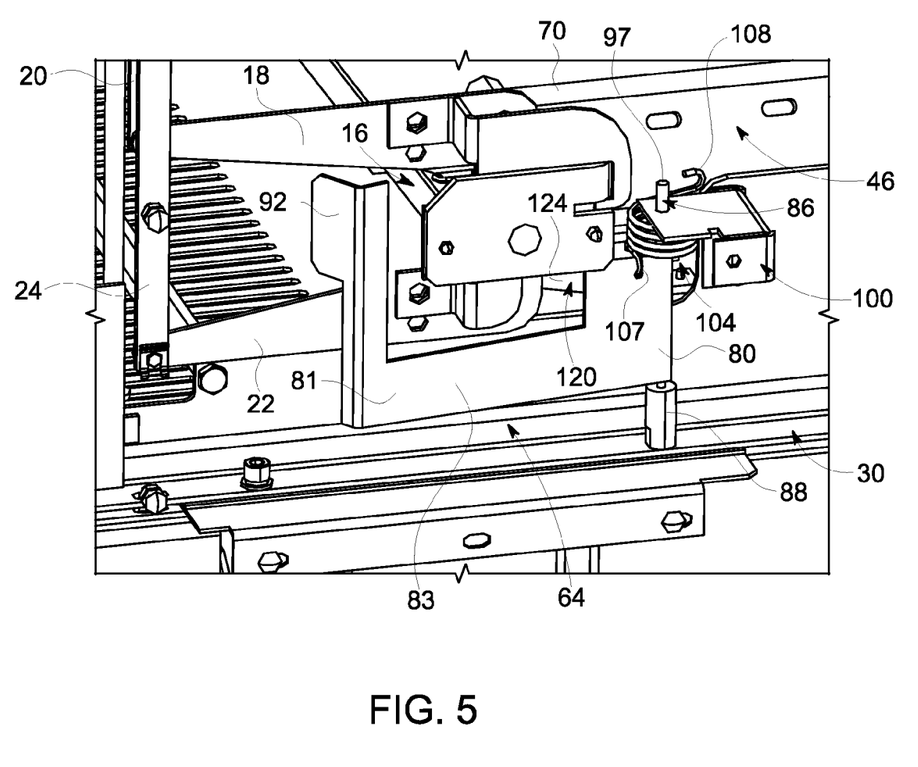
FIG. 5 illustrates the shutter interlock of FIG. 4 in a deployed position blocking movement of the first and second shutters from the closed position.

As best shown in FIG. 4, shutter interlock 64 extends from a first end 80 to a second end 81 through an intermediate portion 83. First end 80 is pivotally mounted to first component support rail 30 through an axel or pin 86 that nests within a bushing 88. Second end 81 includes a shutter locking plate 92 that extends between first and second operating levers 18 and 22 to prevent shutters 12 and 14 from opening. Pin 86 defines an axis of rotation of the shutter interlock and extends from a first end (not shown) that nests within bushing 88 to a second end 97 that is connected to first component support rail 30 by an interlock support 100. A return spring 104 extends around an upper portion of pin 86 between first end 80 of shutter interlock 64 and interlock support 100. More specifically, return spring 104 extends from a first end section 107 connected to first end 80 of shutter interlock 64 to a second end section 108 that connects with interlock support 100. In this manner, return spring 104 biases shutter interlock 64 in the deployed configuration, such as shown in FIG. 5.

Figure 6:
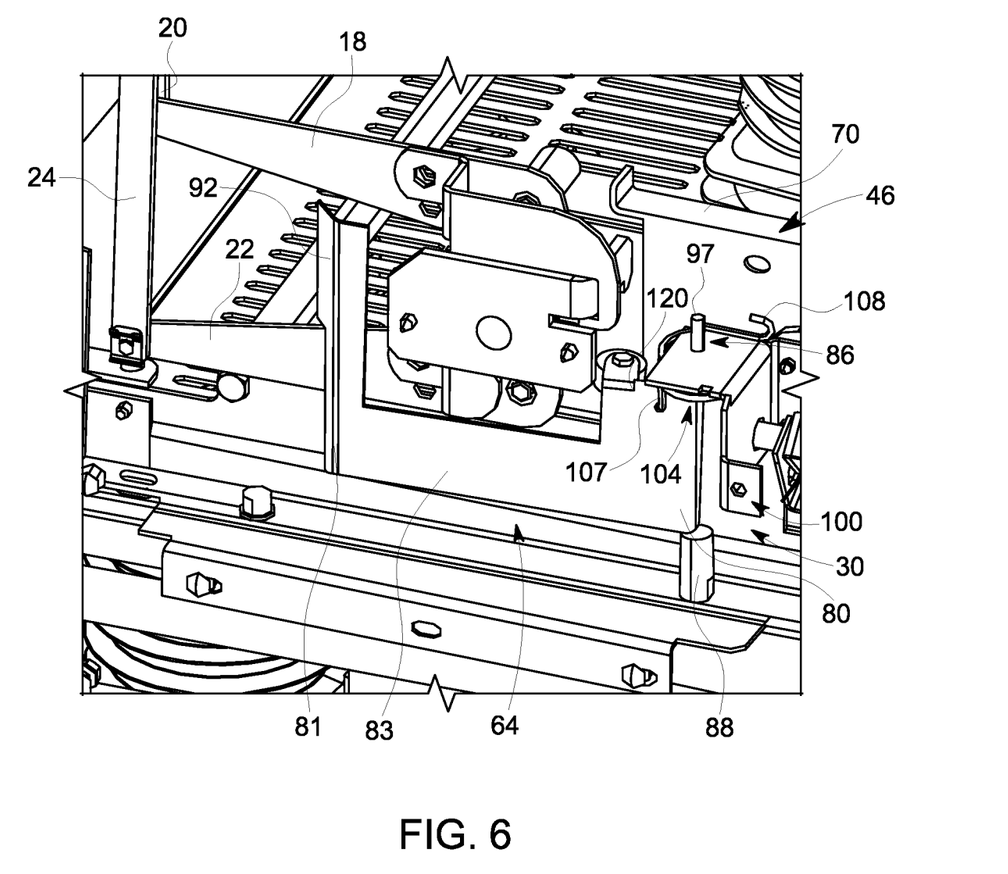
FIG. 6 illustrates the electrical component of FIG. 3 engaging the shutter interlock.
Figure 7:
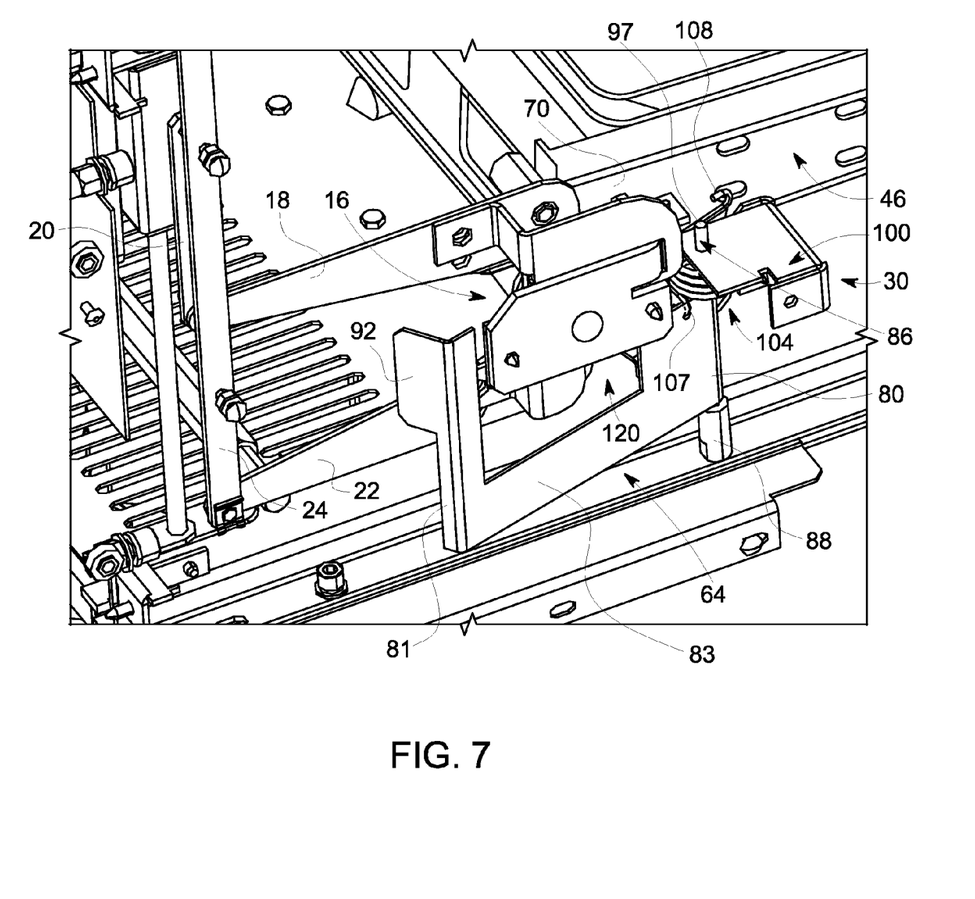
FIG. 7 illustrates the electrical component shifting the shutter interlock to a non-deployed position.

Shutter interlock 64 also includes an activation member 120 that is acted upon by interlock engagement member 70, as shown in FIG. 6. In accordance with an aspect of the exemplary embodiment, activation member 120 may include a roller 124 to reduce drag forces between shutter interlock 64 and interlock engagement member 70. When electrical component 40 is inserted into electrical component portion 8, support bracket 46 engages with activation member 120 through roller 124 initiating a pivoting of shutter interlock 64 (FIG. 6). Continued insertion of electrical component 40 causes support bracket 46 to engage with activation member 120 pivoting shutter interlock 64 from a deployed position (FIG. 5) to a non-deployed position (FIG. 7 in which shutters 12 and 14 are free to open. Once shutter interlock 64 is shifted to the non-deployed position, shutters 12 and 14 may open, and terminals 50 and 52 may engage with bus bars (not shown) in bus bar portion 6.

At this point it should be understood that the exemplary embodiments provide an interlock system that constrains opening of shutters that separate a bus bar portion from an electrical component portion of an electrical enclosure. The interlock system may be arranged on a single component support rail, or as shown, be arranged on each component support rail. However, it should be understood that the interlock system may be arranged in other portions of the enclosure that are exposed to an electrical component. Further, while the activation member is shown to include a roller, other mechanisms may be used to engage with an electrical component support rail.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An electrical enclosure arranged to receive an electrical component, the electrical enclosure comprising:
    a housing including a bus bar portion and an electrical component portion, the electrical component portion being arranged to receive the electrical component;
    at least one shutter being moveably arranged between the bus bar portion and the electrical component portion; and
    a shutter interlock arranged in the electrical component portion, the shutter interlock being configured and disposed to prevent the at least one shutter from shifting from a closed position to an open position when the electrical component is absent from the electrical component portion of the housing;
    wherein the shutter interlock extends from a first end pivotally mounted relative to the housing to a second end through an intermediate portion, the shutter interlock further including an activation member arranged along the intermediate portion, the activation member being configured and disposed to cooperate with the electrical component to shift the shutter interlock from a deployed to a non-deployed position;
    wherein the activation member includes a roller.

2. The electrical enclosure according to claim 1, further comprising: a first component support rail arranged in the electrical component portion and a second component support rail arranged in the electrical component portion spaced from the first component support rail, the shutter interlock being mounted to one of the first and second component support rails.

3. The electrical enclosure according to claim 2, further comprising: the electrical component arranged in the electrical component portion, the electrical component including a support bracket that slidingly engages with the first and second component support rails, the support bracket including an interlock engagement member configured and disposed to shift the shutter interlock from a deployed position to a non-deployed position.

4. The electrical enclosure according to claim 3, wherein the electrical component comprises a circuit breaker.

5. The electrical enclosure according to claim 1, wherein the at least one shutter interlock second end includes a shutter locking plate.

6. The electrical enclosure according to claim 5, wherein the at least one shutter includes a shutter operating lever, the shutter locking plate being configured and disposed to selectively engage with the shutter operating lever to restrict opening of the at least one shutter.

7. The electrical enclosure according to claim 5, wherein the shutter interlock includes a return spring arranged at the first end, the return spring being configured and disposed to bias the shutter interlock in a deployed position.

8. The electrical enclosure according to claim 5, wherein the shutter interlock includes an axel arranged at the first end, the axel defining an axis of rotation of the shutter interlock.

9. A switchgear for housing a circuit breaker, the switchgear comprising:
    a housing including a bus bar portion and a circuit breaker portion arranged to receive the circuit breaker;
    a first circuit breaker support rail arranged in the circuit breaker portion and a second circuit breaker support rail arranged in the circuit breaker portion spaced from the first circuit breaker support rail, the first and second circuit breaker rails being arranged to support the circuit breaker in the circuit breaker portion;
    at least one shutter arranged in the housing separating the bus bar portion and the circuit breaker portion, the at least one shutter being selectively moveable between an open position and a closed position; and
    at least one shutter interlock pivotally mounted to one of the first and second circuit breaker support rails, the at least one shutter interlock being configured and disposed to prevent the at least one shutter from shifting from the closed position to the open position when the circuit breaker is absent from the circuit breaker portion of the housing;
    wherein the at least one shutter interlock extends from a first end pivotally mounted relative to the housing to a second end through an intermediate portion;
    wherein the at least one shutter interlock includes an activation member arranged along the intermediate portion, the activation member being configured and disposed to cooperate with the circuit breaker to shift the shutter interlock from a deployed to a non-deployed position;
    wherein the activation member includes a roller.

10. The switchgear according to claim 9, further comprising: the circuit breaker arranged in the circuit breaker portion, the circuit breaker including a support bracket that slidingly engages with the first and second circuit breaker support rails, the support bracket including an interlock engagement member configured and disposed to shift the at least one shutter interlock from the deployed position to the non-deployed position.

11. The switchgear according to claim 9, wherein the at least one shutter interlock second end includes a shutter locking plate.

12. The switchgear according to claim 11, wherein the at least one shutter includes a shutter operating lever, the shutter locking plate being configured and disposed to selectively engage with the shutter operating lever to restrict opening of the at least one shutter.

13. The switchgear according to claim 11, wherein the at least one shutter interlock includes a return spring arranged at the first end, the return spring being configured and disposed to bias the at least one shutter interlock in a deployed position.

14. The switchgear according to claim 11, wherein the at least one shutter interlock includes an axel arranged at the first end, the axel defining an axis of rotation of the at least one shutter interlock.

15. The switchgear according to claim 9, wherein the at least one shutter includes a first shutter and a second shutter arranged above the first shutter, the at least one shutter interlock, selectively preventing each of the first and second shutters from shifting from a closed position to an open position when the circuit breaker is removed from the housing.

16. The switchgear according to claim 9, wherein the at least one shutter interlock includes a first shutter interlock pivotally mounted to the first circuit breaker support rail and a second shutter interlock pivotally mounted to the second circuit breaker support rail.

* * * * *